Patented May 9, 1944

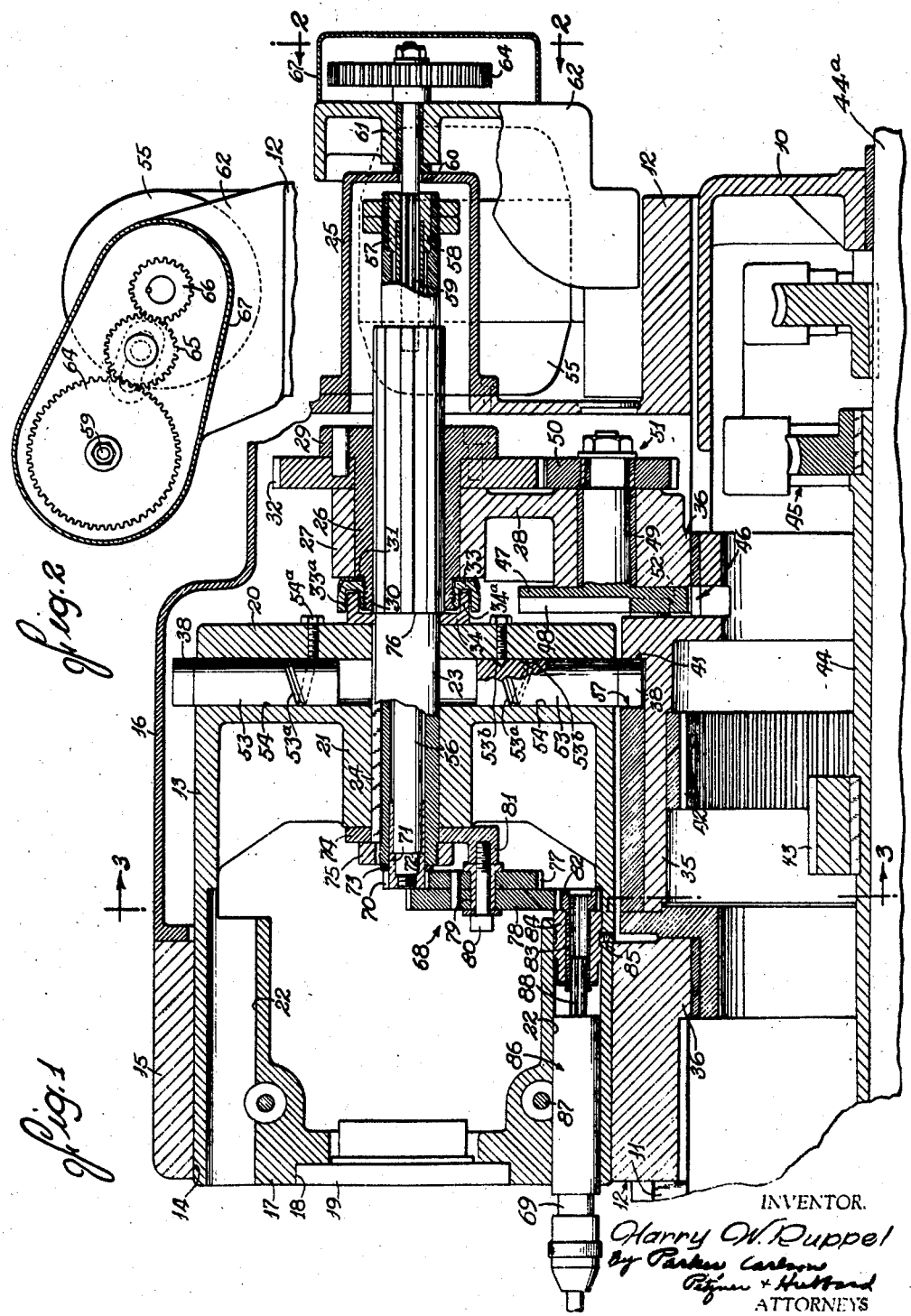

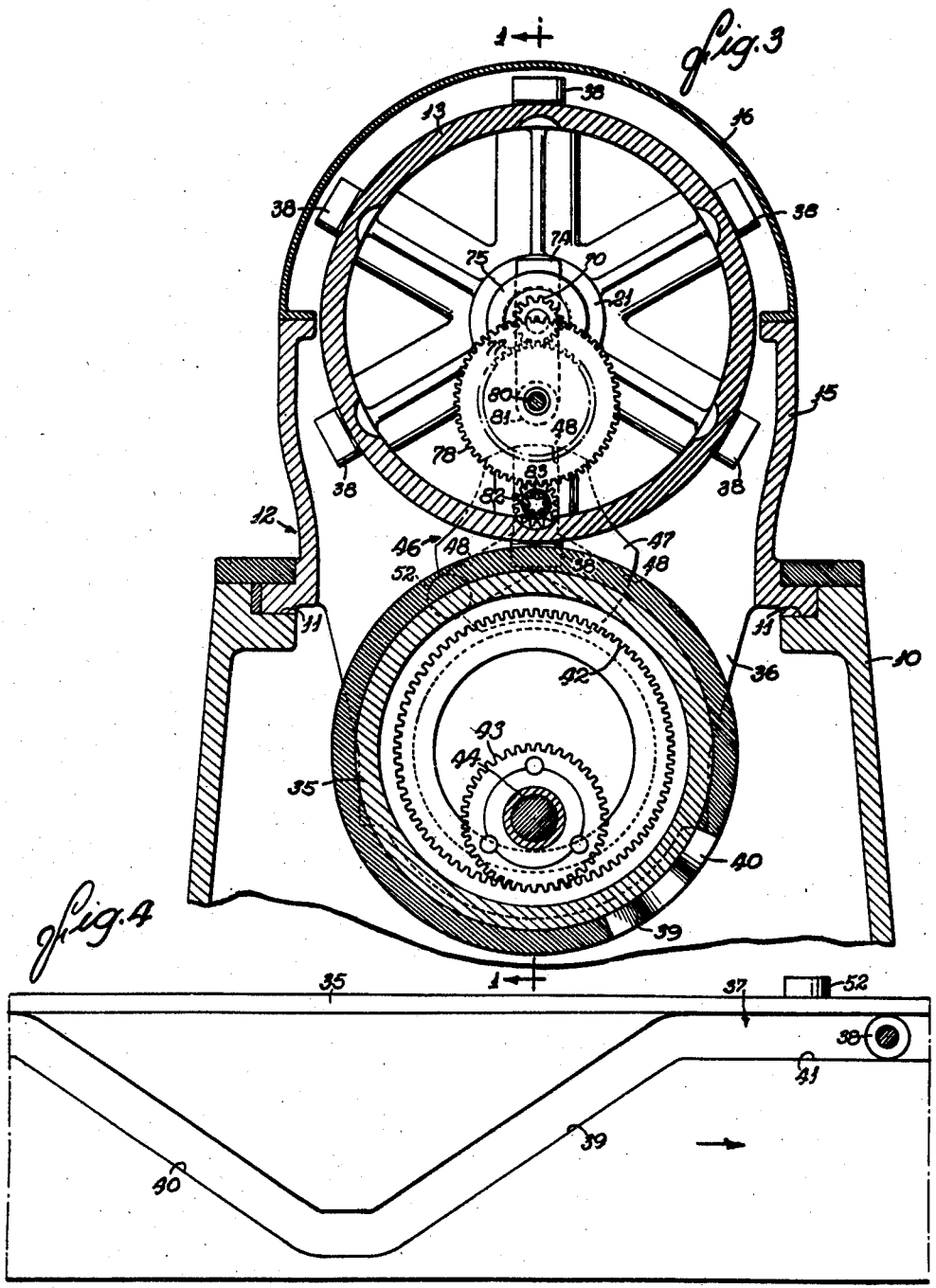

2,348,364

UNITED STATES PATENT OFFICE 2,348,364

TURRET ACTUATING MECHANISM

Harry W. Ruppel, Cleveland, Ohio, assignor to The Foote-Burt Company, Cleveland, Ohio, a corporation of Ohio Original application May 11, 1940, Serial No. 334,625. Divided and this application October 10, 1942, Serial No. 461,570

7 Claims. (Cl. 29—40)

The present invention relates to improvements in turrets adapted to be intermittently rotated to index different tools successively into a working station, and to be translated axially between successive indexing movements, and has particular reference to the means for translating the turret.

One of the objects of the invention is to provide a new and improved indexing means which is selectively adjustable to eliminate axial translation of the turret between any two or more indexing movements.

Other objects and advantages will become apparent as the description proceeds.

In the accompanying drawings,

Figure 1 is a vertical axial sectional view taken substantially along line 1—1 of Fig. 3 through a turret embodying the features of my invention.

Fig. 2 is a transverse vertical sectional view taken substantially along line 2—2 of Fig. 1.

Fig. 3 is a fragmentary sectional view taken substantially along the broken line 3—3 of Fig. 1.

Fig. 4 is a plan development of the cam drum for reciprocating the turret.

The present application is a division of my copending application Serial No. 334,625, filed May 11, 1940.

The turret, which is herein disclosed for purposes of illustration, is adapted for use in an automatic screw machine of the type wherein a bar of stock is fed intermittently through a hollow spindle and clamped in an automatic chuck, and is subjected to the successive operations of a plurality of cutting tools mounted on the turret.

Referring more particularly to the drawings, the machine comprises a frame 10 formed on the top with parallel spaced ways 11 supporting a slide 12. A hollow cylindrical turret 13 is mounted for rotation and axial reciprocation in a split guide sleeve or bearing 14 forming part of a turret housing 15 rigid with the slide 12. The outer end portion of the housing 15 is closed at the top by a cover 16, and is adapted to receive the drive end of the turret 13 projecting inwardly from the guide sleeve 14.

Both ends of the turret 13 are closed, the outer end wall 17 having an axial opening 18 normally closed by a removable plate 19 and through which access to the interior may be had, and the inner end wall 20 having an axial internal bearing sleeve 21. Formed in the forward end of the turret 13 are a plurality of parallel holes 22 located in uniformly spaced relation about the axis of rotation, and adapted to receive and support the shanks or spindles of a plurality of cutting tools. These holes are defined by tubular enlargements formed on the inner periphery of the turret 13, and open to the outer end face of the wall 17. It will be understood that any suitable number of tool holes 22 may be provided, and in the present instance six are shown. Any number of tools up to six and of different types as required by the number, sequence and nature of the machine operations to be performed on different kinds of workpieces may be mounted on the turret 13.

The turret 13 has an axial tubular drive shaft 23, the inner end of which extends through the sleeve 21 and is secured thereto by a longitudinal key 24, and the outer end of which extends through the housing 15 into a tubular housing extension 25. Consequently, the drive shaft is connected to the turret 13 for joint rotation and axial movement. Splined to the outer end portion of the turret shaft 23 for relative axial sliding movement is a bearing sleeve 26. This sleeve is rotatably confined against endwise movement in a bearing 27 integral with a vertical bracket 28 on the turret slide 12. One end of the sleeve 26 is formed with a peripheral flange 29, and the other end has a reduced threaded extension 30 defining a shoulder 31. A spur gear 32 is positioned on the sleeve 26 between the bearing 27 and the flange 29, and is rigidly connected to the latter. Threaded onto the extension 30 of the sleeve 26 against the shoulder 31 is a nut 33. The gear 32 and the nut 33 are in rotary bearing engagement with the opposite end faces of the sleeve 27, and serve to maintain the sleeve in axial position. Consequently, the turret 13 is adapted to be rotated by the gear 32, and is free to reciprocate axially. Rigidly secured to the end of the turret 13 about the shaft 23 is a plate 34 having an annular flange 34ᵃ adapted to enter loosely into an annular groove 33ᵃ in the adjacent face of the nut 33. The groove 33ᵃ and the flange 34ᵃ constitute a dashpot for damping the end of the return movement of the turret 13 into retracted position.

The means for reciprocating the turret 13 comprises a hollow cam drum 35 mounted for rotation on a parallel axis within the frame 10. In its preferred form, the cam drum 35 is supported at its ends for rotation in depending bearing brackets 36 on the slide 12, and is provided with a continuous peripheral cam groove 37 of suitable configuration. Mounted on the periphery of the turret 13 and corresponding in number and spacing to the holes 22 are a plurality of cam rollers 38 adapted for successive engagement with the cam groove 37. The groove (see Fig. 4) has one section 39 with a lead adapted through engagement with any one of the rollers 38 to move the turret 13 in an advance stroke, another section 40 having a reverse lead for retracting the turret in a return stroke, and a peripheral dwell section 41 for maintaining the turret in retracted position. The slope of the cam sections 39 and 40 may be the same or different. If the section 40 has a steeper slope than the section 39, the turret will give a quick return movement.

In the retracted position, the turret 13 is adapted to be indexed, and in the course of each indexing movement one roller 38 will leave the cam groove 37 and the succeeding roller will enter the groove. By reason of the dashpot 33ª, 34ª, heavy impact of the rollers 38 against the dwell end 41 of the cam groove 37 is prevented. Secured within the cam drum 35 is an internal gear 42 which meshes with a pinion 43 fixed on a sleeve shaft 44 journaled on a cam shaft 44ª extending eccentrically through the drum. The tubular shaft 44 is connected through a worm and worm gear drive 45 to a suitable source of power (not shown).

The gear 32 is adapted to be rotated periodically through a predetermined degree, by an intermittent motion device 46 operable by the cam drum 35, to index the tool turret 13 once for each revolution of the drum and hence after each cycle of tool reciprocation. The turret 13 is indexed in each step through the angular distance between consecutive tool holes 22 to locate the holes successively in the working station. In the present instance, the intermittent motion device 46 is of the Geneva type, comprising a star wheel 47 having a plurality of uniformly peripherally spaced arms, for example, three, formed in one side respectively with open-ended slots or grooves 48. The wheel 47 is fixed on one end of a stub shaft 49 journaled in the bearing bracket 28. A gear 50 secured by a key and nut arrangement 51 to the other end of the shaft 49 meshes with the gear 32 to complete the drive relationship to the turret 13. The cam drum 35, which constitutes the driver, carries a roller 52, on one end face adjacent the periphery, which is arranged to engage one of the slots 48, and thereby to rotate the wheel 47 through one-third revolution each time the cam drum makes a complete revolution. The angular phase relation between the cam groove 37 and the roller 52 about the axis of the drum 35 is such that the turret 13 will be indexed while in retracted or inoperative position. Hence, the dwell portion 41 of the cam groove 37 is in engagement with the operative index roller 38 on the turret 13, and positioned to receive the next succeeding roller.

The turret 13 may be indexed a number of times between successive cutting cycles to skip any one or more tools or tool holes 22 not required in a particular machining operation. This is accomplished by retracting the associated index roller or rollers 38 out of the range of the cam groove 37. In the present instance, each roller 38 is coaxially mounted on the outer end of a pin 53 slidable in a radial bore 54 in the turret 13. A set screw 54ª, threaded through the end wall 20 of the turret 13, engages in a helical spline groove 53ª of a comparatively long lead formed in the periphery of the pin 53. The groove 53ª is of the exact length required for the axial range of movement of the pin 53, and preferably is formed at the very ends with locating recesses 53ᵇ adapted selectively to receive the end of the screw 54ª. The roller 38 can be caused to recede into or project from the bore 54 merely by loosening the screw 54ª, then turning the pin 53 through the range of the groove 53ª, and then retightening the screw. Assuming that one of the rollers 38 is retracted, this roller, when indexed into registration with the cam groove 37, will not establish a driving connection between the turret 13 and the cam drum 35. Consequently, the cam drum will rotate through one revolution without causing reciprocation of the turret. Normal operation will be resumed after the second indexing movement. If, for example, two consecutive rollers 38 are retracted, the cam drum 35 will revolve twice without reciprocating the turret.

Rotation of both the work and the tool is desirable in high speed drilling operations. In the present instance, means is provided for establishing a rotary drive from an individual motor 55 through the turret shaft 23 and turret 13 to a drill spindle mounted in one of the holes 22. This means comprises a tubular shaft 56 extending axially through and rotatable in the turret shaft 23. A coupling sleeve 57 with internal axial splines is rigidly secured to the outer end of the shaft 56, and is seated for rotary bearing engagement in a counterbore 58 in the outer end of the shaft 23. Extending through the coupling sleeve 57 in driving engagement therewith and into the shaft 56 for relative axial reciprocation is a splined drive shaft 59. This shaft projects from the casing extension 25 through a central opening 60, and is journaled in and extends through a bearing 61 on a bracket 62 supporting the motor 55 and mounted on the outer end of the slide 12. A gear 64 is keyed to the outer end of the shaft 59, and is connected through an adjustable idler gear 65 to a gear 66 on the shaft of the motor 55. The gears 64, 65 and 66 are suitably enclosed by a housing 67 on the bracket 62. Thus, the motor 55 is connected to drive the shaft 56 entering the turret 13 in all positions of axial movement of the latter.

The inner end of the shaft 56 is adapted to be connected through speed change gearing 68 to a rotary tool spindle 69. To this end, a central pinion 70 is threaded onto the inner end of the shaft 56. The pinion has an axial hub 71 engaging a shoulder 72 on the shaft 56, and is spaced from the inner end of the turret shaft 23 by an interposed bearing washer 73. It will be seen that the spline coupling sleeve 57 and the pinion 70 serve to confine the shaft 56 against axial movement in the turret shaft 23.

A bracket or carrier disk 74 is keyed to the inner end of the turret shaft 23, and is secured in position against the inner end of the shaft supporting sleeve 21 by a nut 75. Hence, the disk 74 and the shaft shoulder 76 engaging the opposite end of the sleeve serve to anchor the turret shaft 23 against endwise movement relative to the turret 13. Cluster gears 77 and 78 are freely rotatable as a unit on a bushing 79 carried by the disk 74. Preferably, the bushing 79 is secured in fixed position on the shank of a bolt 80 threaded into an eccentric boss 81 on the face of the disk 74. The innermost gear 77 meshes with the pinion 70 and the other gear 78 meshes with a pinion 82 for driving the associated rotary spindle 69.

The spindle gear or pinion 82 is fixed on the inner end of a tubular internal spline shaft 83 which is journaled in a bearing sleeve 84 removably secured in the inner end of the hole 22 by means of a set screw 85. The spindle 69 forms part of a self-contained spindle unit or structure 86 removably inserted into the outer end of the hole 22, and secured in position by a suitable clamp 87. The spindle unit 86 has an inwardly extending axial drive shaft 88 which is externally splined and extends into the shaft 83 to complete the spindle drive connection. By reason of the telescoped arrangement between the shafts 83 and 88, the spindle unit 86 may be secured in different axial positions as required by the particular depth of hole to be drilled.

I claim as my invention:

1. In a machine tool, in combination, a frame, a turret housing on said frame, a turret mounted in said housing for axial reciprocation and for rotary indexing movements and having a plurality of tool holes annularly arranged in uniformly spaced relation about the axis of rotation, a cam drum mounted in said frame for rotation about an axis parallel to said turret axis and having cam means for reciprocating said turret in forward and reverse directions, drive means for rotating said drum, a plurality of pins projecting from said turret for movement in the successive indexing movements of said turret into operative engagement with said cam means and corresponding in number and spacing to said tool holes, each pin being adjustable in said turret selectively into projected position for engagement by said cam means or into retracted position out of the range of said cam means, and means operable in timed relation to said drum to index said turret step by step respectively after successive revolutions of said drum.

2. In a machine tool, in combination, a frame, a turret slide on said frame and having a turret housing with a turret guide sleeve, a hollow cylindrical turret mounted in said sleeve for axial reciprocation and for rotary indexing movements and having a plurality of tool holes annularly arranged in uniformly spaced relation about the axis of rotation, a cam drum mounted in said frame for rotation about an axis parallel to said turret axis and having a continuous peripheral cam groove with a forward helical lead and a reverse helical lead, drive means for rotating said drum, a plurality of pins projecting radially from the periphery of said turret for movement successively into operative engagement with said cam groove and corresponding in number and spacing to said tool holes, each pin carrying a cam roller and being adjustable in said turret selectively into projected position for engagement by said groove or into retracted position out of the range of said groove, and means including a Geneva motion device operable from said cam drum to index said turret once for each revolution of said drum.

3. In a machine tool, in combination, a support, a turret mounted on said support for rotary indexing movements and for axial reciprocation in a cycle comprising forward and return strokes, and having a plurality of holes arranged in uniformly spaced relation about the axis and movable successively in consecutive indexing movements into an operative station, a plurality of cam followers mounted on said drum and corresponding in number and spacing to said holes, cam means operable through selective engagement with said followers to reciprocate said turret, means for indexing said turret once after each cycle to position said sockets successively in said station and to move the associated followers successively into position for engagement by said cam means, and means for selectively disabling any one of said followers whereby to skip the corresponding cycle of reciprocation in the recurrent operation of said cam means.

4. In a machine tool, in combination, a rotary turret mounted for axial reciprocation, a drive cam recurrently movable transversely of said turret and having a reversible throw axially of said turret, a cam follower pin extending slidably and rotatably from a radial bore in said turret for rotary indexing movement by said turret into and out of operative association with said cam, a helical groove in the periphery of said pin, and a spline member projecting from said turret into said groove, whereby reverse rotation of said pin in said bore will cause said pin to be respectively retracted from or projected into range for engagement by said cam.

5. In a machine tool, in combination, a rotary turret mounted for axial reciprocation, a drive cam recurrently movable transversely of said turret and having a reversible throw axially of said turret, a cam follower pin projecting slidably from a radial bore in said turret for rotary indexing movement by said turret into and out of operative association with said cam, and means for securing said pin in said bore selectively in retracted position out of the path of said cam or in projected position into range for operative engagement by said cam to reciprocate said turret.

6. In a machine tool, in combination, a rotary turret mounted for axial reciprocation, a drive cam recurrently movable transversely of said turret and having a reversible throw axially of said turret, and a plurality of cam follower pins projecting generally radially from said turret in peripherally spaced relation and adapted for movement respectively into and out of cooperative association with said cam for successive indexed positions of said turret, at least one of said pins being adjustable out of the range of said cam whereby to render said cam ineffective to reciprocate said turret in the corresponding indexed position.

7. In a machine tool, in combination, a rotary turret mounted for axial reciprocation, a drive cam recurrently movable transversely of said turret and having a reversible throw axially of said turret, a plurality of cam follower pins projecting generally radially from said turret in peripherally spaced relation and adapted for movement respectively into and out of cooperative association with said cam for successive indexed positions of said turret, each of said follower pins extending slidably and rotatably into a radial bore in said turret and supporting a roller on the outer end for engagement with said cam, each of said pins being formed in the periphery with a long lead helical groove having locating recesses at opposite ends, and a spline screw threaded in said turret and engaging in said groove, said screw when released permitting rotation of said pin in said bore to move said pin either into projected position for engagement by said cam or into retracted position out of the range of said cam, and when tightened to engage in one or the other of said recesses serving to lock said pin in adjusted position.

HARRY W. RUPPEL.